United States Patent [19]

Paul

[11] Patent Number: 5,999,932

[45] Date of Patent: Dec. 7, 1999

[54] SYSTEM AND METHOD FOR FILTERING UNSOLICITED ELECTRONIC MAIL MESSAGES USING DATA MATCHING AND HEURISTIC PROCESSING

[75] Inventor: Sunil Paul, San Francisco, Calif.

[73] Assignee: Bright Light Technologies, Inc., San Francisco, Calif.

[21] Appl. No.: 09/006,527

[22] Filed: Jan. 13, 1998

[51] Int. Cl.$^6$ .................................................. G06F 15/173
[52] U.S. Cl. ................................ 707/10; 707/6; 707/526; 395/200.36; 395/200.37; 395/683
[58] Field of Search .................................. 707/6, 10, 526, 707/102; 395/200.36, 200.37, 683, 200.53, 200.43

[56] References Cited

U.S. PATENT DOCUMENTS

| 5,377,354 | 12/1994 | Scannell et al. | 395/673 |
|---|---|---|---|
| 5,619,648 | 4/1997 | Canale et al. | 395/200.36 |
| 5,796,948 | 8/1998 | Cohen | 709/206 |
| 5,822,527 | 10/1998 | Post | 395/200.36 |
| 5,826,022 | 10/1998 | Nielsen | 395/200.36 |
| 5,884,033 | 3/1999 | Duvall et al. | 709/206 |
| 5,930,479 | 6/1999 | Hall | 709/238 |

FOREIGN PATENT DOCUMENTS

| 375 138 A2 | 6/1990 | European Pat. Off. . |
|---|---|---|
| 0 420 779 A2 | 4/1991 | European Pat. Off. . |
| 0 720 333 A2 | 7/1996 | European Pat. Off. . |
| 2 271 002 | 3/1994 | United Kingdom . |
| WO 96/35994 A1 | 11/1996 | WIPO . |

OTHER PUBLICATIONS

Harker, R., "Selectively rejecting Spam using sendmail", Proceedings of the elventh systems administration conference, abstract only, Oct. 1997.

Gaskin, J.E., "Don't get get spammed (e–mail)", Informationweek, abstract only, Aug. 1997.

"Method For Automatic Contextual Transposition upon Receipt Of Item Of Specified Criteria," IBM Technical Disclosure Bulletin, vol. 37, No. 02B, Feb. 1994, p. 333, XP000433867.

*Primary Examiner*—Jean R. Homere
*Attorney, Agent, or Firm*—Covington & Burling

[57] ABSTRACT

A system for eliminating unsolicited electronic mail generates and stores a user inclusion list including identification data for identifying e-mail desired by the user. Data from one or more fields of incoming electronic mail messages are compared with the identification data stored in the user inclusion list. If the electronic mail message data matches corresponding identification data from the user inclusion list, the e-mail message is marked with a first display code, such as "OK." If no match is detected, the system performs at least one heuristic process to determine whether the electronic mail message may be of interest to the user. If the message satisfies one or more criteria as determined by the heuristic process and is therefore of potential interest to the user, the message is marked with a second display code, such as "NEW." If the e-mail message does not satisfy any of the heuristic criteria, the e-mail message may be marked with a third display code, such as "JUNK." The processed e-mail messages are displayed to the user in a display mode corresponding to the display codes respectively assigned to the messages.

31 Claims, 7 Drawing Sheets

| "FROM" | "TO" | "CC" | "BCC" | "SUBJECT" |
|---|---|---|---|---|
| Smith@ibm.com | SPaul@aol.com | SPaul@aol.com | SPaul@aol.com | INTERNET |
| Turner@msn.com | | | | PATENTS |
| Mom@aol.com | | | | TRADEMARKS |
| Gore@eop.gov | | | | THE WEB |

SYSTEM AND METHOD FOR FILTERING UNSOLICITED ELECTRONIC MAIL MESSAGES USING DATA MATCHING AND HEURISTIC PROCESSING

FIELD OF THE INVENTION

The present invention relates to a method and system for filtering electronic mail ("e-mail") sent to one or more users via a communications network to eliminate unsolicited e-mail from the user's electronic mailbox. The method and system according to the present invention sort e-mail messages by comparing one or more predetermined data fields of each e-mail message with data stored in an automatically updated database of acceptable addresses and domains. The e-mail messages with matching data are forwarded to the respective user's mailbox. The e-mail messages without matching data are sorted using one or more heuristic sorting methods and categorized either as "junk," which are not of interest to the user, or as "new," which are of potential interest to the user. Each message is displayed to the user in accordance with its respective status.

BACKGROUND OF THE INVENTION

The rapid increase in the number of users of electronic mail and the low cost of distributing electronic messages via the Internet and other electronic communications networks has made marketing via electronic mail ("e-mail") an attractive advertising medium. Consequently, e-mail is now frequently used as the medium for widespread marketing broadcasts of messages to e-mail addresses, commonly known as "spam."

Users of electronic mail, however, frequently are not eager to have their e-mail boxes filled with unsolicited e-mails. Users accessing the Internet through large service companies such as America Online® (AOL) or Microsoft Network® (MSN) or large businesses such as IBM® and General Motors® are targeted by e-mail marketers. The sending and receiving of unsolicited e-mail messages are increasing problems for both online services and corporations. Online services object to unsolicited mail because it reduces their users' satisfaction of their services, and corporations want to eliminate unsolicited mail because it reduces worker productivity.

There are a number of known methods for filtering unsolicited e-mail. Typically, these methods are designed to block e-mails from particular e-mail addresses that originate unsolicited e-mail. For example, filtering methods used by America On Line® and Prodigy® use an exclusion filter that blocks e-mail messages received from addresses that are suspected sources of unsolicited e-mail are blocked. However, this approach is vulnerable to rapid changes in the source of unsolicited e-mail. Furthermore, because courts have ruled that online services can not automatically block e-mail addresses from their members, these services are available only if the user requests them.

Other known e-mail filtering techniques are based upon an inclusion list, such that e-mail received from any source other than one listed in the inclusion list is discarded as junk. However, these methods require the user and/or service provider continually to update the inclusion list manually. If the inclusion list is not updated regularly, the list will quickly become outdated, resulting in exclusion of desired e-mail messages from new sources and continued inclusion of undesired e-mail messages from old sources.

SUMMARY OF THE INVENTION

In view of the drawbacks of the known methods for filtering unsolicited e-mail, an object of the present invention is to provide a system and method for eliminating unwanted e-mail messages. According to the present invention, incoming e-mail messages are filtering using an automatically updated inclusion list. E-mail messages received from sources other than those on the automatically updated inclusion list are not automatically discarded. Instead such e-mail messages are further processed using one or more heuristic processing techniques to determine whether the e-mail is truly junk mail or is instead e-mail from a new source which may be of interest to the user. Thus, the subject invention makes it possible to eliminate virtually all of unsolicited e-mail messages and is not vulnerable to changes in the unsolicited e-mail origin addresses. The present invention also enables the user to receive new e-mail of potential interest to the user even though the source of the e-mail is not included in the user's inclusion list. Furthermore, because the filtering is performed based upon parameters defined by the user, the invention should not be subject to the court rulings of exclusion filters used to date.

A method for eliminating unsolicited electronic mail according to the present invention includes the steps of:

(a) automatically generating and storing a user inclusion list including identification data for identifying e-mail desired by the user;

(b) receiving an electronic mail message;

(c) comparing data from the received electronic mail message with identification data in the user inclusion list;

(d) upon identifying a match between the electronic mail message data and the identification data, marking the e-mail message with a first display code; and (e) displaying the electronic mail message marked with the first display code to the user, wherein the electronic mail marked with the first display code is displayed to the user in a first display format.

The method further includes the following steps:

(f) upon failing to detect a match between the electronic mail message data and the identification data in the user inclusion list, performing at least one heuristic process to determine whether the electronic mail message may be of interest to the user;

(g) upon identifying the electronic mail as of interest to the user, marking it with a second display code;

(h) displaying the electronic mail marked with the second display code to the user; and (i) upon failing to identify the electronic mail as of interest to the user, marking the electronic mail message with a third display code, wherein the e-mail message is displayed to the user.

A system for eliminating electronic unsolicited mail according to the present invention includes an inclusion list processor for automatically creating and storing identification data for identifying e-mail desired by the user; an e-mail storage unit for storing incoming electronic mail messages; an e-mail filter for filtering the stored incoming electronic mail messages in accordance with the identification data stored in the inclusion list processor; and a user interface for displaying the filtered electronic mail messages to a user and for enabling the user to modify the identification data stored in the inclusion list processor.

The foregoing and other features, aspects, and advantages of the present invention will become more apparent from the following detailed description when read in conjunction with the accompanying drawings.

DETAILED DESCRIPTION OF THE PREFERRED EMBODIMENTS

The present invention will now be described with reference to the accompanying drawings, which are provided as illustrative examples of preferred embodiments of the present invention. Notably, the present invention may be implemented using software, hardware or any combination thereof as would be apparent to those of skill in the art.

Figure 1:
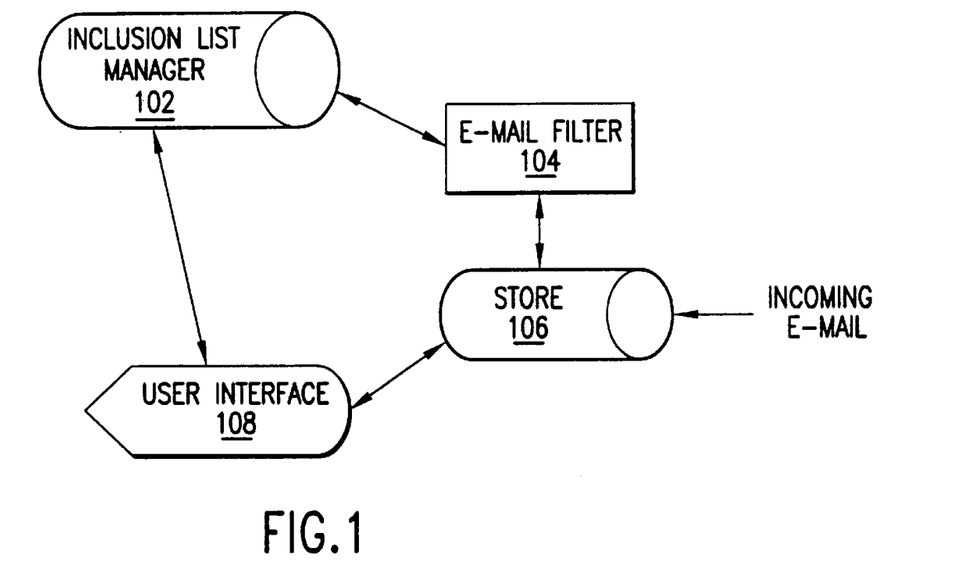
FIG. 1 provide a block diagram of the components of a user-site software system in accordance with the present invention.

As shown in FIG. 1, a preferred embodiment of a user terminal software system for eliminating unsolicited e-mail in accordance with the present invention includes an inclusion list manager 102 that creates, stores and automatically maintains a user inclusion list. The user inclusion list includes all identification data needed to determine the status of incoming e-mail messages. As will be described below in further detail, the user inclusion list may be created and maintained automatically and also modified manually by the user.

The user terminal software system of FIG. 1 further includes an e-mail storage database 106 that receives and stores incoming e-mail and stores records of outgoing e-mail. An e-mail filter 104 filters the incoming e-mail stored in store 106 in accordance with the user inclusion list stored in database 102. A user interface 108 receives inputs from the user and displays e-mail information to the user. The user interface 108 may be implemented, for example, using a known e-mail software software package, such as Netscape® Messager®, Microsoft® Outlook®, Microsoft® Exchange®, Lotus® cc: mail®, Lotus Notes®, Novell® Groupwise®, Eudora®, or America OnLine®. User interface 108 may be used, for example, to display a user's mailbox, receive and process e-mail messages and inputs from the user, manage the user's mailbox, and display mailbox management information to enable the user to manage the mailbox.

According to one embodiment of the present invention, the e-mail filter 104 filters incoming mail received in the user's e-mail store 106 based upon three fields of data contained in the incoming e-mail, the "FROM" field, the "TO" field and the "SUBJECT" field. Notably, filtering may also include the "CC" field and the "BCC" field to filter e-mail messages on which the user is listed as a CC or BCC recipient rather than a direct recipient. Preferably, the e-mail filter 104 compares the "FROM", "TO", "CC", "BCC", and "SUBJECT" fields of an incoming e-mail message with the corresponding data categories stored in the inclusion list manager 102.

In a preferred embodiment, if the data in any of the fields of the incoming e-mail message match data in the corresponding data category stored in the inclusion list manager 102, the e-mail is marked by the filter 104 with a first display code indicating the "OK" status of the message. The marking of the incoming e-mail may be accomplished using known programming techniques as would be know to one of skill in the art, for example, by adding an additional field of information to the received e-mail format or by altering one or more existing e-mail fields to indicate the display status of the e-mail. The e-mail message is then displayed in the user's inbox by the user interface 108 in accordance with the first display code.

If the e-mail filter 104 does not detect a match between the stored inclusion list data and the data from the received e-mail message, the incoming e-mail is further processed using one or more heuristic processing techniques to determine whether the e-mail may be of interest to the user. The filtering process and the heuristic processing techniques will be described in further detail below. If the e-mail message satisfies one or more criteria as determined with the heuristic processing, the e-mail message is marked with a second display code. If the data in the e-mail message do not match the data in the inclusion list and if the message also does not satisfy the heuristic processing criteria, then the message is marked with a third display code.

Each e-mail message is thus displayed to the user in accordance with its respective display code, thereby indicating the status of the message to the user.

Figure 2:
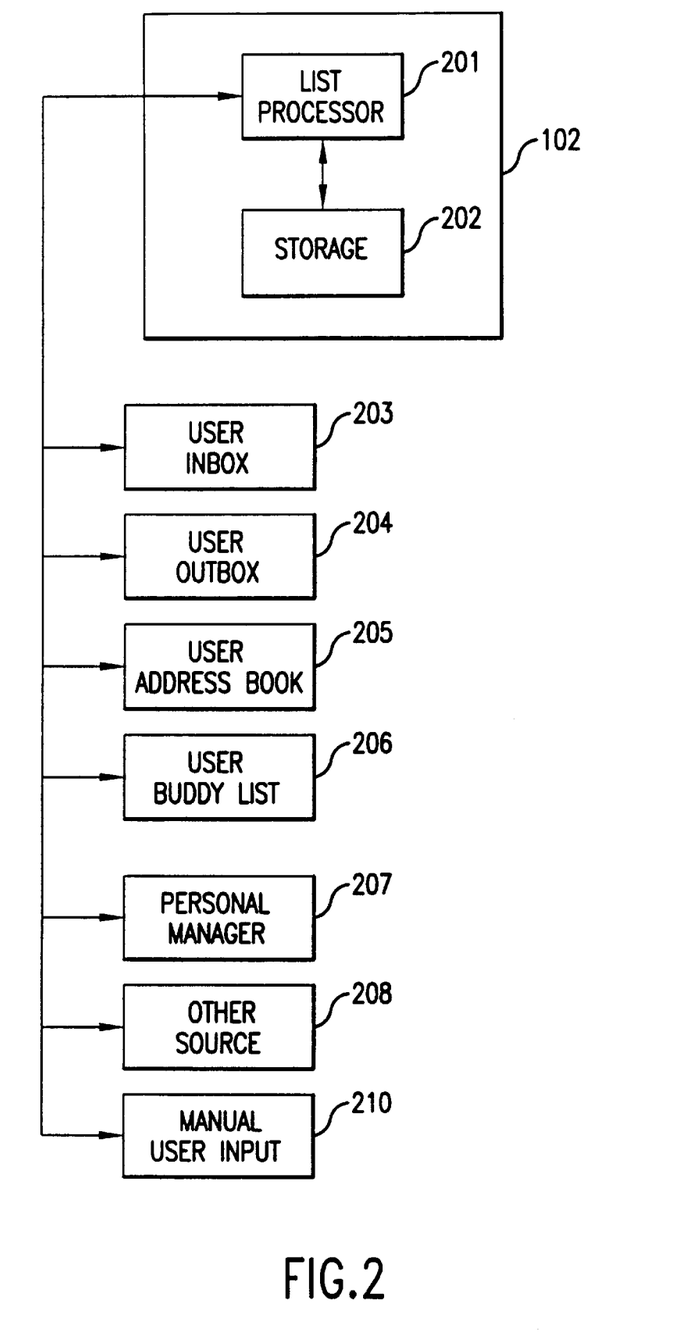
FIG. 2 provides a block diagram of the components of an inclusion list processor for use in the system of FIG. 1.

FIG. 2 provides a block diagram of an inclusion list manager 102 for use in the system of FIG. 1. The inclusion list manager 102 includes a list processor 201 and a storage unit 202. The storage unit 202 stores the user inclusion list as created and maintained by the list processor 201.

Figure 5:
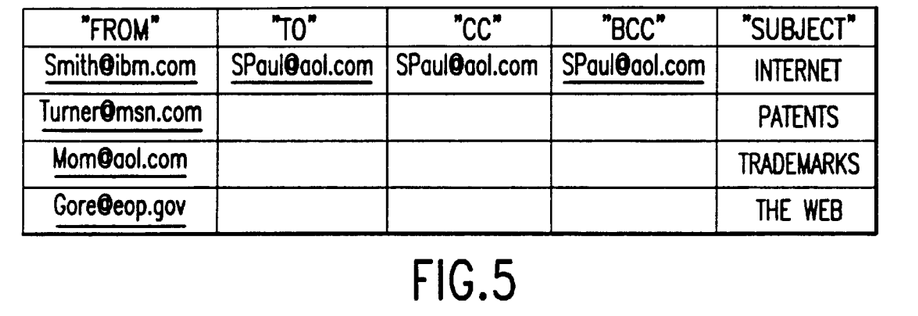
FIG. 5 provides an example of data stored in a user inclusion list.

According to one embodiment of the present invention, the inclusion list processor 201 automatically creates, stores and updates five different categories of data corresponding to five different data fields of incoming e-mail messages: "TO," "FROM," "CC," "BCC," and "SUBJECT" and other user-definable text fields in the header. An example of such a list is shown in FIG. 5.

The "FROM" data stored by the inclusion list processor 201 is created and maintained as follows. In the preferred embodiment depicted in FIG. 2, the list processor 201 initially creates the user inclusion list by automatically gathering acceptable e-mail source addresses from a plurality of sources 203 through 208. Sources 203 (user's inbox), 204 (user's outbox), and 205 (user's address book), for example, may be stored within the user's e-mail store 106 and may be accessed through user interface 108. As depicted in FIG. 2, source 206 is a database for storing a list of e-mail addresses defined by the user. This may include, for example, the e-mail addresses displayed by the user's real-time awareness and notification system. Such systems generate displays of e-mail addresses corresponding to other users who are on-line at the same time as the user. This functionality may be provided, for example, using programs such as AOL's Buddy List®, Excite's® Personal Access List®, or AOL's Instant Messenger®.

Source 206 may be stored on a server (not shown) connected to the user site by a communications network (not shown). As shown in FIG. 2, sources 207 (user's personal manager) and 208 (other programs) are independent software programs stored on the user's computer or a server (not shown) attached to the user's computer via a communications network (not shown). In the preferred embodiment depicted in FIG. 2., when the filtering system according to the present invention is first initiated, the list processor 201 automatically accesses the e-mail addresses stored in sources 203 through 208, formats them into an inclusion list (see FIG. 5), and stores them in storage unit 202. Thus, the user's initial inclusion list is automatically created.

In a preferred embodiment, the list processor 201 also automatically updates the inclusion list. In order to insure that the inclusion list remains current, the list processor 201 accesses (polls) e-mail address information from the sources 203 to 208 at predetermined intervals of time such as hourly, daily, weekly or monthly. The update process may also be implemented as an interrupt-driven process prompted by one or more of the sources 203 through 208. The list processor 201 compares the e-mail addresses stored in sources 203 to 208 with those stored in the user inclusion list and adds new e-mail addresses from the sources 203 to 208 to the inclusion list. In this way, the user inclusion list may be automatically updated.

In addition to automatically adding new e-mail source addresses to the inclusion list, the list processor 201 may also optionally delete old addresses from the inclusion list. For example, the list processor 201 may be programmed to delete an e-mail address from the inclusion list when the e-mail address is not stored in the user's address book, buddy list or personal manager and has not appeared in the user's inbox or outbox for a predetermined period of time, such as a month. The user may also be prompted to delete an inclusion list entry as a result of the user's deletion of an entry from the user's inbox, outbox, address book, buddy list or personal manager. The functionality of list processor 201 may be accomplished using known programming techniques as would be apparent to one of skill in the art.

The user may also manually modify the user inclusion list through the user interface 108. The list processor 201 receives any modification instructions from the user, such as "add e-mail address," "delete e-mail address," or "modify e-mail address," and modifies the stored user inclusion list accordingly.

The "TO," "CC," and "BCC" inclusion list categories may be initially set to automatically include the e-mail address of the user. If so, then any incoming e-mail messages having the user's e-mail address in the "TO," "CC" or "BCC" field will be displayed in the user's inbox. This category of the user inclusion list serves to distinguish e-mail specifically directed to the user from e-mail addressed to broad categories of users. As with the "FROM" category of the inclusion list, the user may manually modify the "TO," "CC" and/or "BCC" categories to add or delete addresses as desired. This category may also be automatically updated to reflect any changes in the user's e-mail address and/or mailing lists to which the user may subscribe.

According to a preferred embodiment of the present invention, the "SUBJECT" category of the user inclusion list may be initially set to automatically include the information in the "SUBJECT" field of each message in the user's e-mail outbox. Thus, any incoming e-mail messages having "SUBJECT" field data matching the "SUBJECT" data of a message in the user's outbox, for example, a reply message, would be displayed in the user's inbox.

According to another preferred embodiment of the present invention, the "SUBJECT" or other user-definable e-mail header category of the inclusion list remains empty until the user manually enters information for this category or the inclusion list. This embodiment of the present invention enables a user to define one or more specific passwords to insure that mail messages sent from individuals with whom the user wants to communicate are never eliminated by the filter as long as those other users include the password in the "SUBJECT" field of their messages. This embodiment also eliminates unsolicited mail more effectively because the filter will pass only those e-mails with specific "SUBJECT" field entries.

The "SUBJECT" data stored in the user inclusion list may be compared to the "SUBJECT" field of the incoming e-mail message, for example, using a text search, keyword search or other search as would be apparent to one of skill in the art. As with the "FROM" category of the inclusion list, the user may manually modify the "SUBJECT" category to add or delete subjects, words or phrases as desired. This category of the inclusion list may also be automatically updated to include new subject data of newly sent e-mail messages in the user's outbox. Other sources of "SUJBJECT" data, such as the user's inbox or data stored in other software programs on the user's computer may also be used to create and maintain the "SUBJECT" category of the user inclusion list stored by inclusion list processor 102.

In addition to the automatic and manual updating of the user inclusion list described above, new data may optionally be added to the user inclusion list as incoming e-mail messages are processed. For example, if a received e-mail message has "SUBJECT" or other user-definable header field data matching "SUBJECT" or other user-definable header data in the inclusion list, the "FROM" and "TO" data from the e-mail message may be automatically added to the user inclusion list by the list processor 201. As another example, when a received e-mail message has "TO" field data matching "TO" data in the inclusion list, the "FROM" and "SUBJECT" [or subset of "SUBJECT"] or user definable header data from the e-mail message may be automatically added to the inclusion list. As a further example, when a received e-mail message has "FROM" field data matching "FROM" data in the inclusion list, the "TO" and "SUBJECT" or user-definable header data may be automatically added to the inclusion list. In these and other manners apparent to users and others of ordinary skill, the inclusion list may be continually and dynamically varied as e-mail messages are received and processed.

A filtering system according to the present invention may be implemented at the user terminal either as an integrated function within a user's e-mail program, such as Netscape Messager, Microsoft Outlook, Microsoft Exchange, Lotus cc: mail, Lotus Notes, Novell mail, Eudora, or AOL, or as a separate user application that interacts with the user's existing e-mail user as would be apparent to one of ordinary skill in the art. In either embodiment, the e-mail filter 104 interacts with the e-mail store 106 to access, modify, and categorize e-mail messages as described above.

Figure 1A:
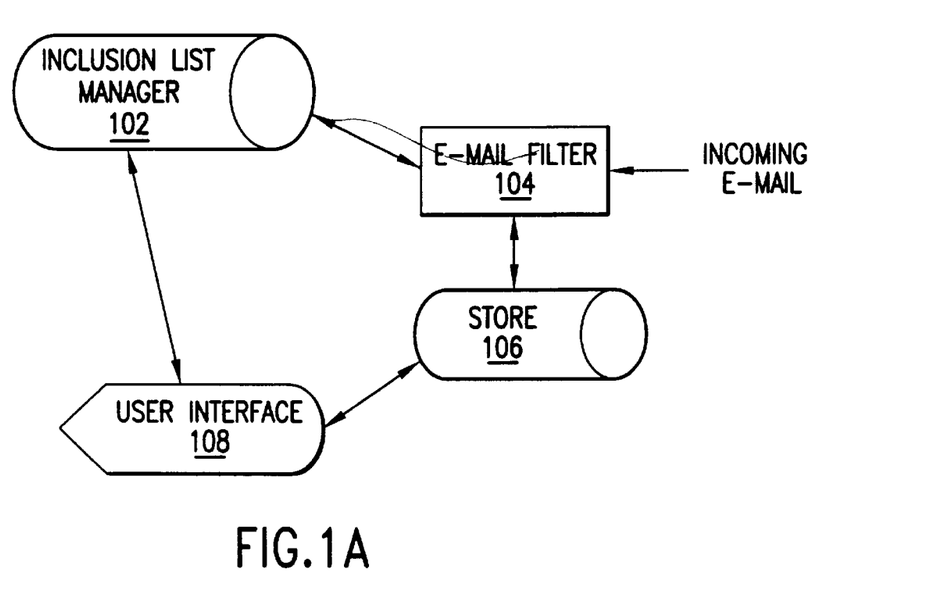
FIG. 1A provides a block diagram of an alternative configuration of the user-site software system shown in FIG. 1.

FIG. 2A illustrates an alternative preferred embodiment of the present invention in which the e-mail filter 104 interacts directly with the network e-mail server. The e-mail filter 104 receives and filters incoming e-mail messages before they are stored in e-mail store 106. This embodiment may be implemented using a known message communications means, such as Microsoft's Mail API (MAPI) or an Internet mail protocol such as Post Office Protocol (POP3), IMAP or Simple Mail Transfer Protocol (SMTP). In a preferred user terminal embodiment, the system according to the present invention is implemented as an add-on system to a known e-mail software package, for example, using MAPI configured as a network service provider. This embodiment has the advantage of simplifying the implementation of the present invention at the user site terminal.

Figure 3:
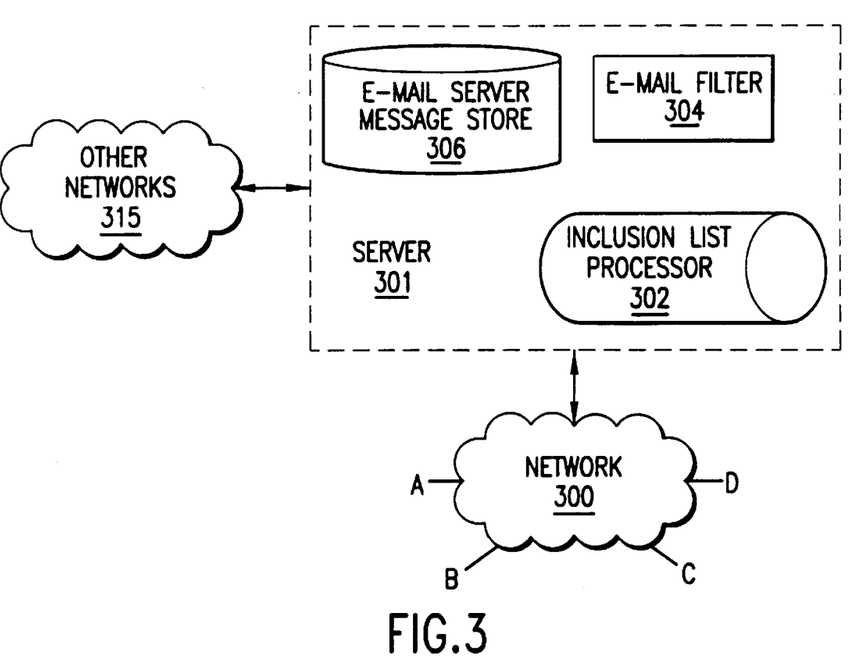
FIG. 3, 3A provide a block diagram of the components of a server-based embodiment of the present invention.

FIG. 3 illustrates a server embodiment of the present invention. This embodiment enables filtering to be performed at a central location for all users within a network such as a local area network (LAN). As depicted in FIG. 3, an e-mail server 301 receives and routes e-mail messages to and from a plurality of users such as A, B, C, and D attached to an electronic data network 300. The e-mail server may also receive e-mail from other networks 315. The e-mail server 301 includes an e-mail server message store 306 for receiving and storing all e-mail messages transmitted within the network 300 and an e-mail filter 304. An inclusion list processor 302 stores and maintains at least one inclusion list for each e-mail address that is serviced by the e-mail server 301. For example, in the network configuration depicted in FIG. 3, the inclusion list processor 302 maintains a separate user inclusion list for each user A, B, C and D.

The operation of the components of the e-mail server 301 shown in FIG. 3 is similar to the corresponding components in the user terminal system of FIG. 1. All e-mail received by server 301 is stored in e-mail store 306. The e-mail filter 304 filters the stored e-mail messages in accordance with the information stored in the inclusion list processor 302. E-mail addressed to each user A, B, C, and D is separately filtered using the inclusion list stored in inclusion list processor 302 for each user respectively. Once the e-mail stored in store 306 is processed by e-mail filter 304, the filtered e-mail is then forwarded to each user's terminal.

In the preferred embodiment of the present invention depicted in FIG. 3, the filtering process performed for each user A, B, C, and D by the e-mail filter 304 is the same as that performed by filter 104 in FIG. 1. The filter 304 compares the data stored in the "TO," "FROM," "CC," "BCC," and "SUBJECT" fields of the incoming e-mail messages with corresponding categories of data stored in the inclusion list processor 302. If data in any of these fields of the incoming e-mail matches data stored in a corresponding field of the inclusion list processor 302, the incoming e-mail is marked "OK" and forwarded to the user. If no match is detected, the e-mail filter 304 performs at least one type of heuristic processing to determine whether the e-mail may be of interest to the user, and, if not, labels the e-mail message accordingly, for example, as "JUNK."

In the preferred server embodiment shown in FIG. 3, the e-mail filter 304 interacts with the e-mail message store 306 that processes the e-mail and performs other known functions for a multiplicity of e-mail addresses or accounts. In the preferred embodiment, the e-mail store 306 is an improved e-mail server message store that stores additional information about the category of each e-mail message. In an alternative preferred embodiment, the status of e-mail messages is handled in a separate database (not shown) outside the message store 306.

As depicted in FIG. 3, the inclusion list processor 302 may store an inclusion list for each e-mail address or, alternatively, an inclusion list for each group of e-mail addresses organized by domain or other group. According to another alternative preferred embodiment, each inclusion list created and maintained by the inclusion list processor 302 includes an additional data field to identify characteristics of at least one user account or e-mail address. This embodiment has the advantage of providing centralized management of account information for electronic messages.

Figure 3A:
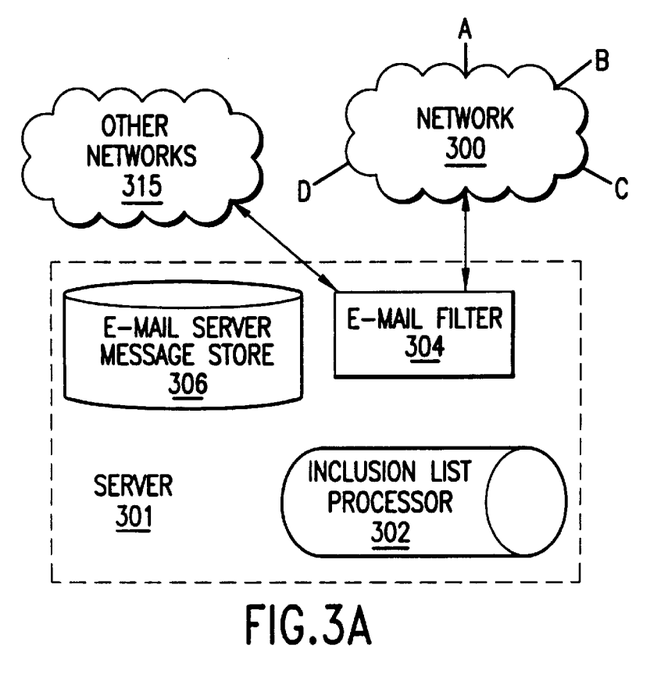

FIG. 3A illustrates an alternative preferred embodiment in which the e-mail filter receives and filters incoming e-mail messages before they are stored in e-mail store 306. This embodiment may be implemented using a known message communications means, such as MAPI or an Internet mail protocol such as POP3, IMAP or SMTP. This embodiment has the advantage of reducing the data traffic flow on a communications link by filtering out unsolicited e-mail before it is stored at the user site.

The preferred embodiment of a server-based embodiment of the present invention has the advantage of enabling quick deployment of the invention because server software can generally be updated more quickly than user software. A server-based embodiment also has the advantages of ease of implementation in an environment where there are multiple e-mail users, and reducing the wasted bandwidth of sending unsolicited e-mail messages to users who will not read them.

A method according to the present invention and performed, for example, by the e-mail filters 104 and 304 shown in FIGS. 1 and 3 respectively will now be described in detail with reference to FIGS. 4 and 5.

Figure 4:
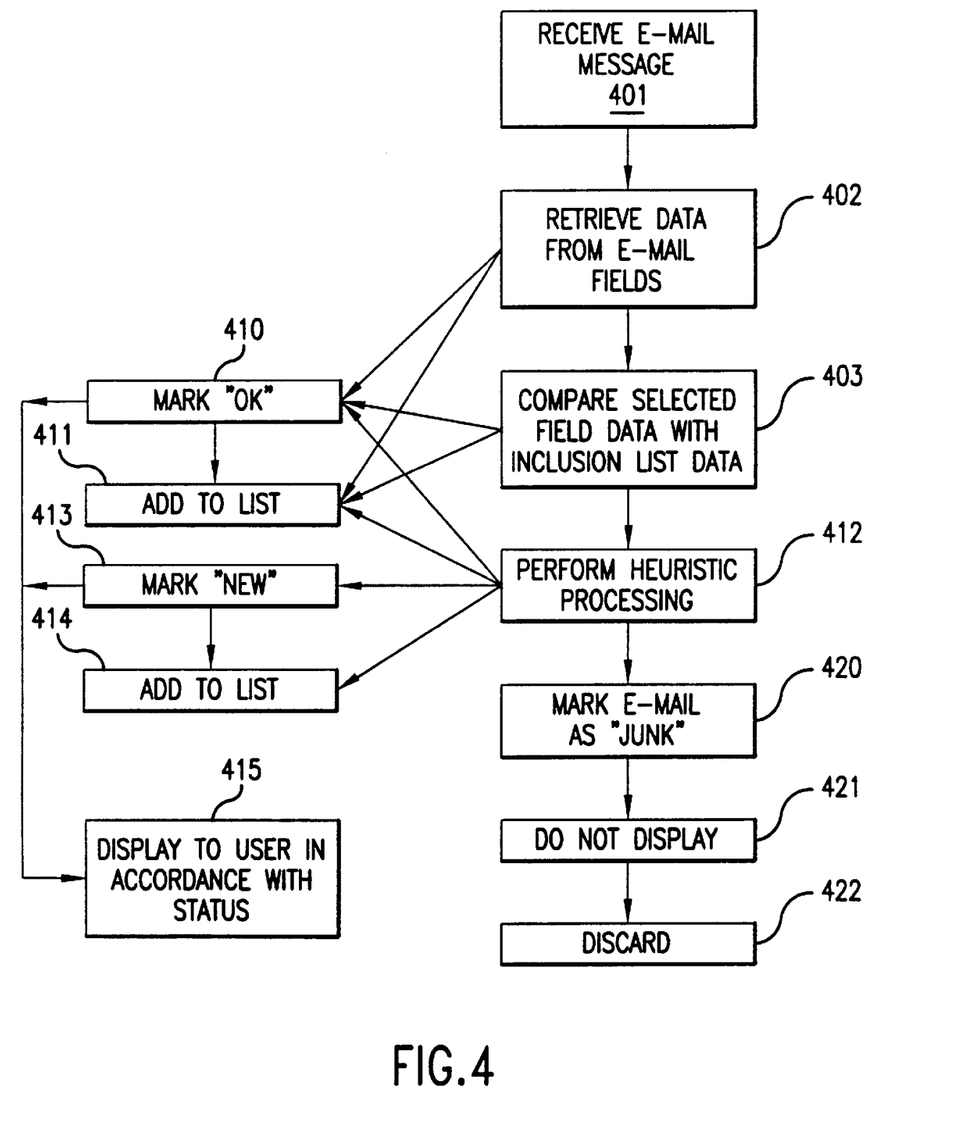
FIG. 4, 4A provide a process flow chart for a method for eliminating undesired unsolicited e-mail according to the present invention.

FIG. 4 provides a process flowchart illustrating the filtering steps performed by e-mail filters 104 and 304. First, in step 401, an e-mail message is received from the network either by a user site system such as the system described in FIG. 1 or by an e-mail server such as the system described in FIG. 3. Upon receipt of an e-mail message, the e-mail filter (e.g., 104 or 304) retrieves data from selected fields of the received e-mail message as shown in step 402. In step 403, the e-mail filter compares the field data retrieved from the received message with data stored in the corresponding category of the user inclusion list. In step 410, if the field data from the received message matches a data entry stored in the corresponding category of the inclusion list, the received message is marked with a first display code indicating that the status of the message is "OK". In step 411, the field data from the received message may optionally be added to the corresponding categories of data in the user inclusion list.

Figure 4A:
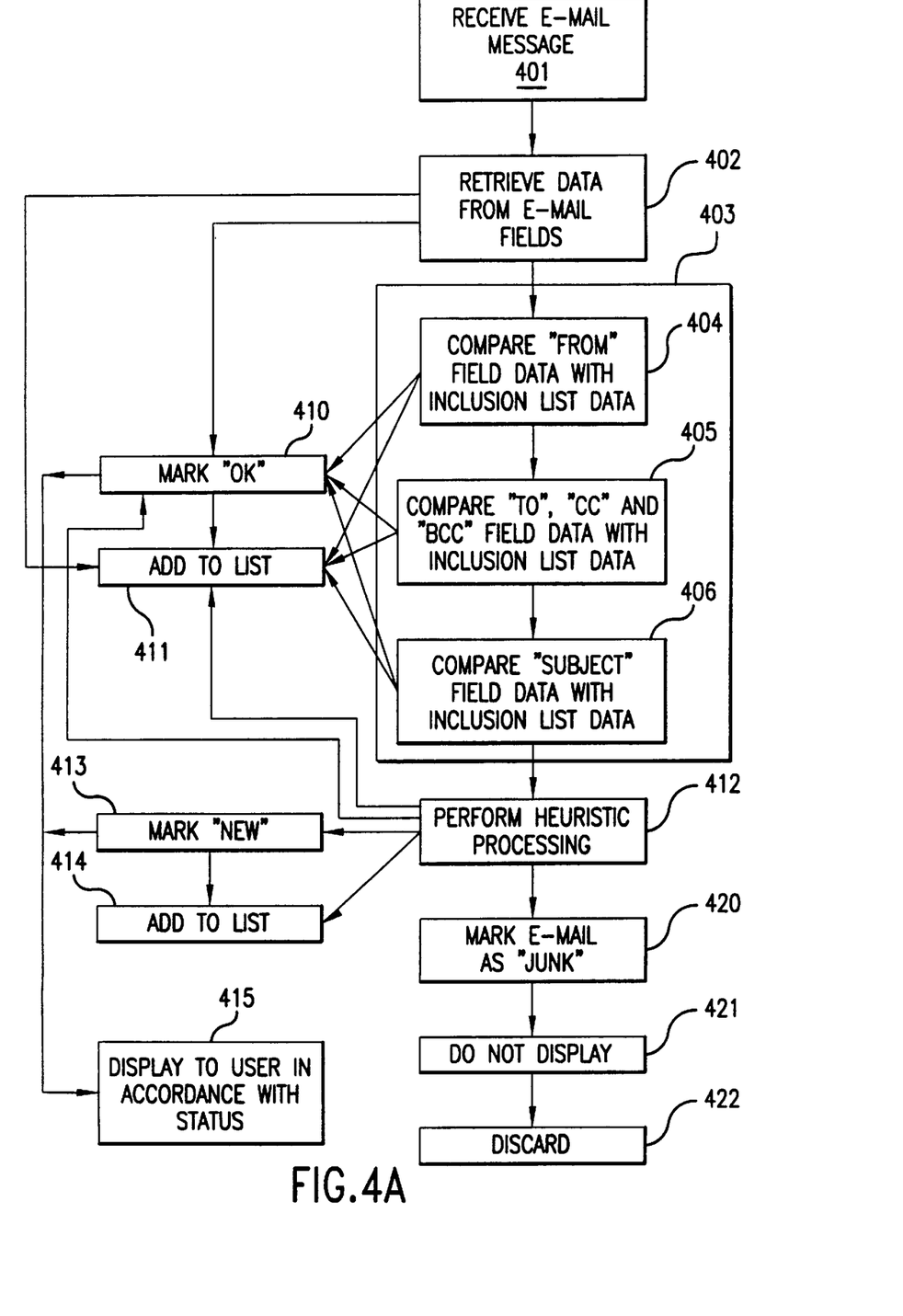

As shown in FIG. 4A, comparing step 403 may include a comparison of data retrieved from the "TO," "FROM" and "SUBJECT" fields of the received message. As shown in step 404, if the "FROM" field data from the received e-mail message does not match any data entry in the "FROM" category of the stored inclusion list, the "TO," "CC," and "BCC" field data from the received message is compared to the corresponding categories of data stored in the user inclusion list in step 405.

As illustrated in step 406 of FIG. 4A, if the "TO" field data from the received e-mail message does not match any data entry in the "TO" category of the stored inclusion list, the text stored in the "SUBJECT" field data of the received message is compared to the corresponding category of text data stored in the user inclusion list. If a match is found, the received message is marked with the first display code indicating that the status of the message is "OK" (step 410). The "FROM" and "TO" data from the received message may optionally be added to the corresponding categories of data in the user inclusion list (step 411).

If no matches of the "FROM," "TO," "CC," "BCC," or "SUBJECT" field data are identified in step 403 of FIG. 4 or steps 404 to 406 of FIG. 4A, in step 412 the e-mail filter performs one or more heuristic processes to determine whether the received e-mail message meets certain criteria suggesting that the message may be of interest to the user. If the e-mail message meets one or more of the heuristic criteria, in step 413 the e-mail is marked with a second display code indicating that the status of the message is "NEW." The "1TO,""FROM" and "SUBJECT" field data from the e-mail message may optionally be added to the user inclusion list by the inclusion list processor (e.g., 102 or 302) as show in step 414.

As shown in step 420, if the e-mail message data does not meet any of the heuristic criteria tested in step 412, the message is marked with a third display code indicating that the e-mail has a "JUNK" status. In one embodiment of the present invention, the e-mail message is not displayed to the user (step 421) and ultimately discarded by the system (step 422).

E-mail messages are displayed to the user in a display format determined by their display codes (step 415). For example, "OK," "NEW" and "JUNK" messages may be displayed in different colors to indicate their different status. Other possible display modes include: a) no modification b) changing the subject line to reflect the status such as changing "Make money FAST!" to "JUNK: Make money FAST!"; c) changing font or appearance of the message subject line to reflect its status; or d) placing the message in a folder based on its status (or other modes as are known in the art). The present invention contemplates numerous display options for the different types of e-mail messages which are apparent to those of skill in the art.

Notably, while the embodiments of the present invention described above describe e-mail processing in which there are three categories of e-mail messages, the use of additional categories are envisioned to fall within the scope of the present invention. These may be defined as necessary by defining additional processing steps. For example, e-mail messages from certain sources may be marked with a display code indicating that they have a "PRIORITY" status. Different e-mail display colors or folders may be defined based upon the identify of the sender, or the subject matter of the messages. Such modifications are intended to fall within the scope of the present invention.

A preferred embodiment of the heuristic processing described in step 412 of FIG. 4 will now be described in additional detail. Heuristic processing according to the present invention involves evaluating the message with one or more of the following rules. The "FROM" field matches a "TO" entry in the user inclusion list;

1. The "FROM" field has a domain that matches an Internet domain of one or more entries in the "FROM" category of the user inclusion list;
2. The "FROM" field has a domain that matches one of a pre-defined list of domains that are assured to be junk-free such as corporations or government organizations.
3. The "FROM" field has a domain that matches one of a multiplicity of domains that are input by the user.

If any of the tests result in a "true" value, the message is marked "NEW." Otherwise, it is marked as "JUNK."

An alternative embodiment to the heuristics includes a user-selectable option to use any of these rules. Another alternative embodiment reduces or adds these rules to either reduced the complexity of implementation or improve the quality of the filtering. Other heuristic filtering rules may also be defined to assist the e-mail filter in identifying e-mails that do not match the stored categories of the user inclusion list but are nonetheless of interest to the user.

Figure 6:
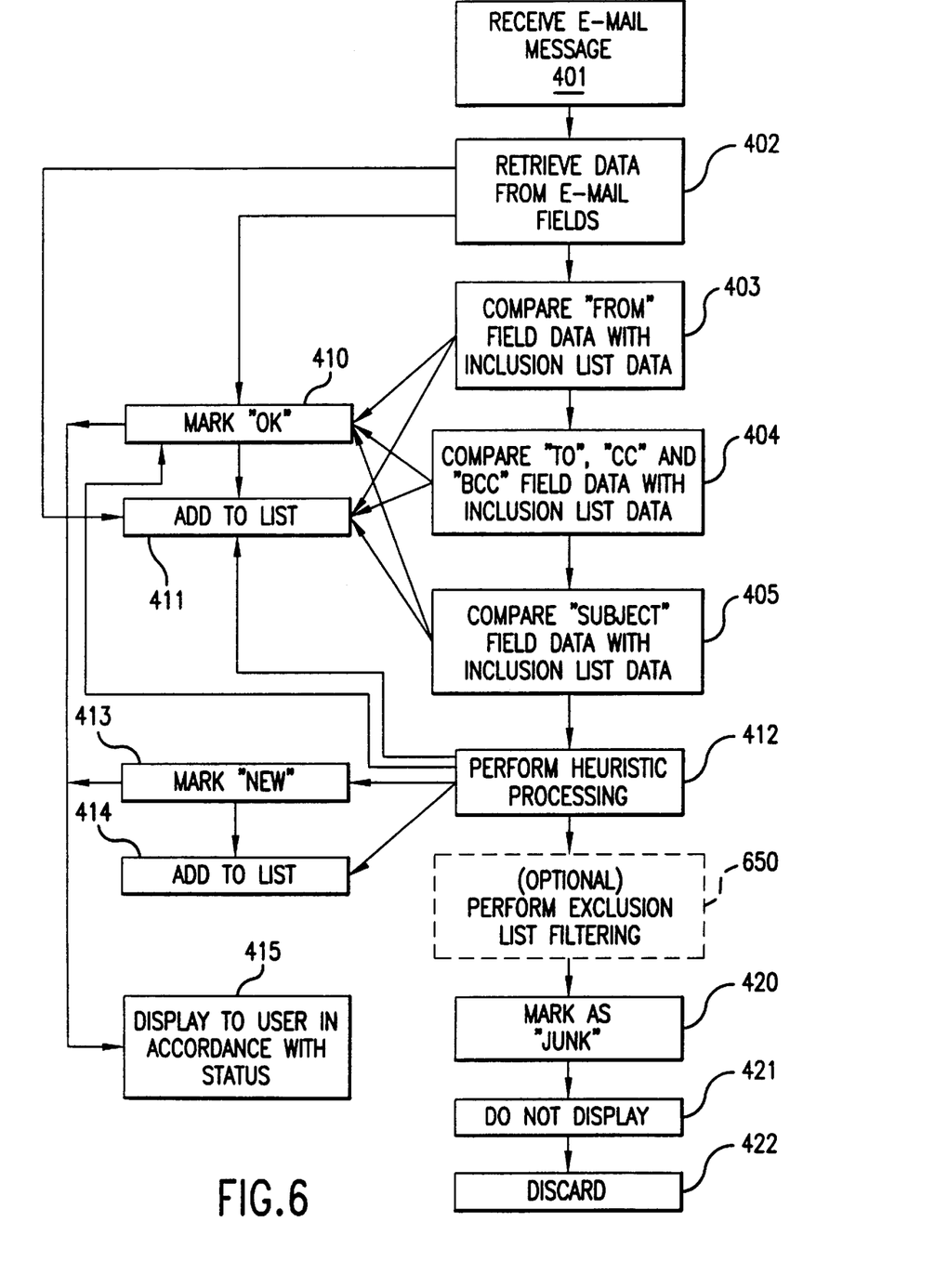
FIG. 6 provides an additional process flow chart for a method for eliminating undesired unsolicited e-mail according to the present invention.

The filtering method according to the present invention may also be implemented in combination with one or more known exclusion-based filtering methods. A preferred embodiment of such a combination method is illustrated in FIG. 6 and includes an additional filtering step 650 in which selected data fields of the received e-mail message are compared to corresponding categories in a stored exclusion list (for example, stored in inclusion list processor 104 or 304). In the preferred embodiment, if any matches are detected, the e-mail message is automatically marked "JUNK." The remainder of the method steps shown in FIG. 6. correspond to similarly numbered steps in FIG. 4.

In a preferred implementation of a combination of the filtering method according to the present invention with an exclusion-based filtering step, filtering of incoming e-mail messages is performed in the following sequence. First, the messages are filtered using inclusion list data defined by the user. Second, the messages are filtered using exclusion list data defined by the user. Third, the messages are filtered using inclusion list data automatically created by the system as described above and/or predefined inclusion list data. Fourth, the messages are filtered using predefined exclusion list data.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

I claim:

1. A method for filtering electronic mail addressed to a user, comprising the steps of:
    storing a user inclusion list including identification data for identifying e-mail desired by the user;
    receiving an electronic mail message;
    comparing data from said received electronic mail message with said identification data;
    upon identifying a match between said electronic mail message data and said identification data, marking said electronic mail with a first display code;
    displaying in a first display format said electronic mail message marked with the first display code to the user;
    upon failing to detect a match between said electronic mail message data and said identification data, performing at least one heuristic process to determine whether said electronic mail message may be of interest to the user;
    upon identifying an electronic mail message of interest to the user, marking said electronic mail with a second display code;
    displaying said electronic mail message marked with said second display code to the user in a second display format;
    upon failing to identify an electronic mail message of interest to the user, marking the electronic mail message with a third display code; and
    displaying said electronic mail message marked with said third display code to the user in a third display format.

2. A method according to claim 1, wherein said inclusion list is created and updated based upon e-mail message data stored in the user's e-mail inbox.

3. A method according to claim 1, wherein said inclusion list is created and updated based upon e-mail message data stored in the user's e-mail outbox.

4. A method according to claim 1, wherein said inclusion list is created and updated based upon e-mail message data stored in the user's e-mail address book.

5. A method according to claim 1, wherein said inclusion list is created and updated in response to e-mail message data stored in the user's personal manager program.

6. A method according to claim 1, wherein said identification data includes a plurality of categories of data corresponding to selected fields of e-mail messages received by the user.

7. A method according to claim 6, wherein said electronic mail data is data stored in selected fields of said received electronic mail message.

8. A method according to claim 1, wherein said first display code indicates that said electronic mail message has a first status, said second display code indicates that said electronic mail message has a second status, and said third display code indicates said electronic mail message has a third status.

9. A method according to claim 1, further comprising the step of varying said inclusion list in response to data from received electronic mail messages marked with said first or second display code.

10. A method according to claim 1, wherein said at least one heuristic process includes at least one of the following tests:
  (a) a test to determine whether a first field of said received electronic mail message matches a corresponding entry in said user inclusion list;
  (b) a test to determine whether said first field of said received electronic mail message has a domain that matches an Internet domain of one or more entries in the corresponding category of said user inclusion list;
  (c) a test to determine whether the first field of said received electronic mail message has a domain that matches one of a pre-defined list of domains; or
  (d) a test to determine whether a second field of said received electronic mail message matches a second entry in said user inclusion list.

11. A method according to claim 1, further comprising the step of filtering said electronic mail message using an exclusion list.

12. A method according to claim 11, wherein, when the data from said electronic mail message matches data stored in said exclusion list, said electronic mail message is marked with said third display code and displayed to the user in said third display mode.

13. A method according to claim 1, wherein said inclusion list is created and updated based upon e-mail message data stored in the user's real-time awareness and notification system.

14. A system for eliminating unsolicited electronic mail, comprising:
  an inclusion list processor for storing identification data for identifying e-mail desired by the user;
  an e-mail storage unit for storing incoming electronic mail messages;
  an e-mail filter for filtering said stored incoming electronic mail messages in accordance with said identification data stored in said inclusion list processor and for marking each of said electronic mail messages with one of a plurality of display codes to indicate a status of each of said messages; and
  a user interface for displaying said filtered electronic mail messages to a user in accordance with said display codes;
  wherein said filtering performed by said e-mail filter includes the steps of
    (a) comparing data from said incoming electronic mail messages with said identification data;
    (b) upon identifying a match between said electronic mail message data and said identification data, marking said electronic mail with a first display code;
    (c) transmitting said electronic mail message marked with the first display code to said user interface;
    (d) upon failing to detect a match between said electronic mail message data and said identification data, performing at least one heuristic process to determine whether said electronic mail message may be of interest to the user;
    (e) upon identifying an electronic mail message of interest to the user, marking said electronic mail message with a second display code; and
    (f) transmitting said electronic mail message marked with said second display code to said user interface.

15. A system according to claim 14, wherein said user interface further enables the user to modify said identification data stored in said inclusion list processor.

16. A system according to claim 14, wherein said filtering further comprises the steps of:
  upon failing to identify an electronic mail of interest to the user, marking the electronic mail message with a third display code; and
  transmitting said electronic mail message marked with said third display code to said user interface.

17. The system according to claim 14, wherein said system is implemented within a user terminal.

18. The system according to claim 14, wherein said system is implemented within a central network server.

19. A system according to claim 14, wherein said inclusion list is created and updated based upon e-mail message data stored in the user's e-mail inbox.

20. A system according to claim 14, wherein said inclusion list is created and updated based upon e-mail message data stored in the user's e-mail outbox.

21. A system according to claim 14, wherein said inclusion list is created and updated based upon e-mail message data stored in the user's e-mail address book.

22. A system according to claim 14, wherein said inclusion list is created and updated in response to e-mail message data stored in the user's personal manager program.

23. A system according to claim 14, wherein said identification data includes a plurality of categories of data corresponding selected fields of incoming e-mail messages.

24. A system according to claim 23, wherein said electronic mail data is data stored in said selected fields of said received electronic mail message.

25. A system according to claim 16, wherein said first display code indicates that said electronic mail message has a first status, said second display code indicates that said electronic mail message has a second status, and said third display code indicates that said electronic mail message has a third status.

26. A system according to claim 14, wherein said inclusion list processor varies said inclusion list in response to data from received electronic mail messages marked with said first or second display code.

27. A system according to claim 14, wherein said at least one heuristic process includes one or more of the following tests:
  (a) a test to determine whether a first field of said received electronic mail message matches a corresponding entry in said user inclusion list;
  (b) a test to determine whether said first field of said received electronic mail message has a domain that matches an Internet domain of one or more entries in the corresponding category of said user inclusion list; or
  (c) a test to determine whether said first field of said received electronic mail message has a domain that matches one of a pre-defined list of domains.

28. A system according to claim 14, further comprising the step of filtering said electronic mail message using an exclusion list, wherein, when the data from said electronic mail message matches data stored in said exclusion list, said electronic mail message is marked with said third display code and displayed to the user in said third display mode.

29. A system according to claim 14, wherein said inclusion list is created and updated based upon e-mail message data stored in the user's real-time awareness and notification system.

30. A method for filtering electronic mail addressed to a user, comprising the steps of:

storing a user inclusion list including identification data for identifying e-mail desired by the user;

receiving an electronic mail message;

comparing data from said received electronic mail message with said identification data;

upon identifying a match between said electronic mail message data and said identification data, marking said electronic mail with a first display code;

displaying in a first display format said electronic mail message marked with the first display code to the user;

upon failing to detect a match between said electronic mail message data and said identification data, performing at least one heuristic process to determine whether said electronic mail message may be of interest to the user;

upon identifying an electronic mail message of interest to the user, marking said electronic mail with a second display code;

displaying said electronic mail message marked with said second display code to the user in a second display format; and upon failing to identify an electronic mail message of interest to the user, marking the electronic mail message with a third display code such that said electronic mail message is not displayed to the user.

31. A method according to claim 30, wherein said at least one heuristic process includes at least one of the following tests:

(a) a test to determine whether a first field of said received electronic mail message matches a corresponding entry in said user inclusion list;

(b) a test to determine whether said first field of said received electronic mail message has a domain that matches an Internet domain of one or more entries in the corresponding category of said user inclusion list;

(c) a test to determine whether the first field of said received electronic mail message has a domain that matches one of a pre-defined list of domains; or (d) a test to determine whether a second field of said received electronic mail message matches a second entry in said user inclusion list.

* * * * *